UNITED STATES PATENT OFFICE.

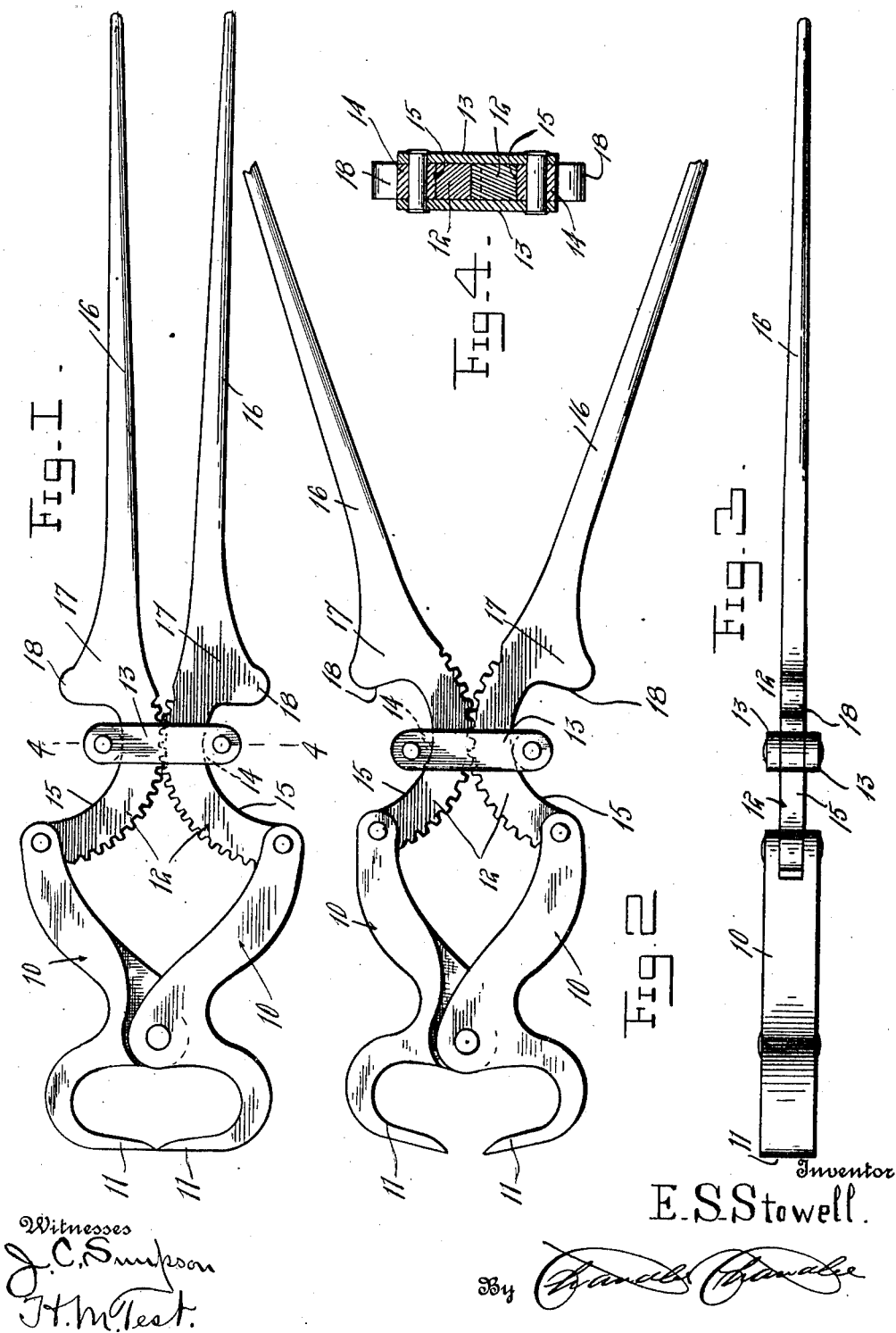

EDWARD S. STOWELL, OF REXBURG, IDAHO.

HOOF-TRIMMER.

1,066,675.  Specification of Letters Patent.  Patented July 8, 1913.

Application filed June 22, 1912. Serial No. 705,240.

*To all whom it may concern:*

Be it known that I, EDWARD S. STOWELL, a citizen of the United States, residing at Rexburg, in the county of Fremont, State of Idaho, have invented certain new and useful Improvements in Hoof-Trimmers; and I do hereby declare the following to be a full, clear, and exact description of the invention, such as will enable others skilled in the art to which it appertains to make and use the same.

This invention relates to improvements in farriers' tools, and particularly to devices for trimming the horse's hoofs.

The principal object of the invention is to provide a simple trimmer of this character by means of which greater leverage power is obtainable when the device is manipulated, than in devices heretofore.

Another object of the invention is to provide a device of this character which is simple of construction, and easy of operation.

Other objects and advantages will be apparent from the following description and with particular reference to the accompanying drawings.

In the drawings: Figure 1 is a side elevation of my device, in closed position, Fig. 2 is a similar view of the device in open position, Fig. 3 is an edge elevation, of the tool, Fig. 4 is a vertical longitudinal sectional view on the line 4—4 of Fig. 3.

Referring particularly to the drawings, 10 represents a pair of pivoted members, having on their outer ends the cutting jaws 11. Pivotally connected to the inner end of each of the members 10 is one end of an arcuate rack 12. The teeth of the racks 12 are held in engagement with each other by means of the yoke 13 which is provided with the rollers 14 engaging the outer smooth edged face 15 of each of said racks. The opposite end of each of the racks has an extension 16 which forms a handle, the portion 17 between the handle and the rack being formed with an enlargement forming the shoulder 18, to limit the movement of the yoke 13 in its rearward direction.

In the operation of the tool pressure is applied to the handles 16 to separate them. This causes the racks to engage each other opening the jaws 11. At the same time the rollers 14 of the yoke 13 hold the racks together, permitting the said racks to move through the yoke between the rollers. Thus the constant pressure is applied to the racks, to hold them in engagement. When the handles are pressed to close the jaws 11, the yoke 13 will move toward the rear ends of the racks and assist in closing them, thus producing a device in which greater leverage power is attained when the handles are completely wide apart. In ordinary devices of this character the leverage is not obtained until the handles of the tools are at least half closed thus greatly detracting from the power and efficiency of the tool.

What is claimed is:

1. In a hoof trimming tool, a pair of cutting jaws pivoted together, an arcuate rack pivoted to each of the cutting jaws, and the racks meshing with each other, handles formed on the racks, stop shoulders formed on the handles at the inner ends of the racks, a yoke embracing the racks, and rollers on the yoke engaging the outer edges of the racks to hold them positively in engagement.

2. In a hoof trimming tool, cutting jaws, handles, meshing rack members formed on the handles and pivotally connected to the jaws, a slidable member embracing the rack members and movable on the rack members to hold them in engagement with each other when the racks are operated, and rotatable means on the slidable member, engaging the rack members.

In testimony whereof, I affix my signature, in presence of two witnesses.

EDWARD S. STOWELL.

Witnesses:
 FRANK STOWELL,
 S. N. STOWELL.